Dec. 15, 1942.  D. G. C. HARE  2,304,910
DETERMINATION OF SPECIFIC GRAVITY OF FLUIDS
Filed May 29, 1940
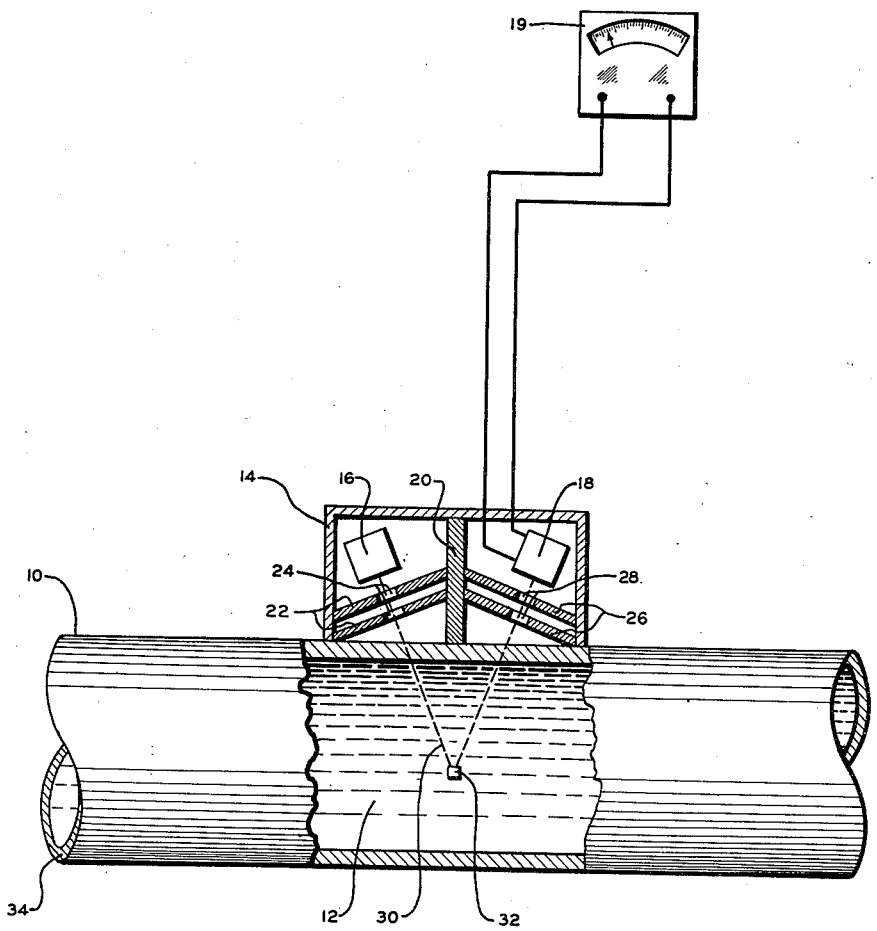
D.G.C. HARE
INVENTOR
BY R.J. Dearborn
Daniel Stryker
HIS ATTORNEYS Patented Dec. 15, 1942

2,304,910

UNITED STATES PATENT OFFICE 2,304,910

DETERMINATION OF SPECIFIC GRAVITY OF FLUIDS

Donald G. C. Hare, Houston, Tex., assignor, by mesne assignments, to The Texas Company, a corporation of Delaware Application May 29, 1940, Serial No. 337,865

8 Claims. (Cl. 250—83.6)

This invention relates to a method and apparatus for determining the density or specific gravity of fluids and more particularly to the determination of the density of inaccessible fluids such as those within a closed container or a pipe line, and which fluids may be subjected to conditions of high pressure or temperature and may be in a state of flow. The primary object of the invention is to provide such a method and apparatus which will give an accurate indication of the density or specific gravity of an inaccessible fluid without the necessity of any direct contact with the fluid.

It is frequently desirable to know accurately the specific gravity or density of a fluid which may be at a high temperature or under high pressure and which may be in a state of flow as through a pipe. This is of particular interest in certain petroleum refining operations where during the refining process the density of a fluid must be continuously controlled in order to prevent coking. In the past, it has been necessary to sample the fluid from time to time so as to make gravity tests or to provide complicated apparatus within or in the path of the fluid. In accordance with the present invention, a determination may be made to a high accuracy of the density or gravity of fluids or other materials without necessitating access to the fluids, as long as they are behind a reasonably thin wall the thickness of which is either known or which remains constant over the period of density determination.

A source of radiation such as gamma rays or other penetrating radiation is placed in close proximity to the outside of the vessel or pipe containing the fluid, and a beam of the radiation penetrates the wall of the container and also the fluid therein. A device capable of detecting rays or particles which are scattered within the fluid and some of which return to the outside of the container is arranged near the source and may be connected to any suitable indicating or recording instrument. All penetrating radiation is to a certain extent scattered or diffusely reflected by the matter through which it traverses, and the amount of radiation scattered from any unit volume will depend upon the number of electrons in this unit volume. Since this number of electrons per unit volume is, except possibility for isotopes, related to the density of the material, the amount of scattering per unit volume will depend upon the density of the material. Thus, it is found that as the density of a material such as a fluid increases, the radiation picked up by the detector will also increase and in this manner a direct measurement may be made of the density of the fluid.

For a better understanding of the invention reference may be had to the accompanying drawing which is a vertical elevation partly in section showing the invention as applied to the determination of the density of the fluid passing through a pipe.

Referring to the drawing, a pipe 10 serves to hold or carry a fluid 12. An instrument having a casing 14 is adapted to be placed against the outer surface of the pipe in the manner shown. The casing 14 houses a source 16 of radiation such as gamma rays or neutrons. This source may be, for instance, a mixture of radium and beryllium. Within the casing 14 is also disposed a device 18 for detecting scattered radiation and this device may be connected electrically to a suitable indicating or recording instrument or meter 19. For gamma rays the detector 18 may be a Geiger-Muller counter or a pressure ionization chamber. A lead shield 20 is disposed between the source 16 and the detector 18 to prevent any unwanted direct gamma radiation therebetween. If neutron radiation is used, the lead shield 20 will tend to prevent passage of slow neutrons from the source 18 directly to the detector and the fast neutrons which may pass through the lead are not easily detected by means of the detector 18. Within the casing 14 is a collimating system comprising shields 22 having slits 24 for defining the direction of the beam of radiation incident on the wall of the pipe 10 and the contents of the pipe. Another collimating system comprising shields 26 and having slits 28 is used to define the direction of the radiation scattered by the fluid 12 and recorded at the detector 18.

It is believed that with the foregoing description the operation will be understood. The rays such as are shown, for instance, by the lines 30 are scattered within the fluid in the pipe and the amount of scattering per unit volume 32 of the fluid will depend upon the density of the material as has been explained hereinbefore. Knowing the thickness and thus the amount of scattering to be expected in the wall 34 of the pipe 10, the meter 19 can be calibrated to indicate or record directly the density of the fluid 12 within the pipe. In actual use the device has been utilized in measuring fluid densities between 0.7 gm./cm.$^3$ (75° Baumé) and 1.0 gm./cm.$^3$ (10° Baumé). These values were obtained from fluids in a pipe having an outside diameter of 6⅝"

and a wall thickness of 0.3 inch. The values obtained checked almost exactly with gravity measurements made directly on samples of the fluids.

The instrument can of course be arranged so that a continuous permanent record of the density of fluids flowing through a pipe or tube can be obtained. Knowing the fluid density of any one temperature, the method can then be used to determine temperature variations in the fluid since the density must vary with the temperature for such nearly incompressible substances as fluids.

Obviously, many modifications and variations of the invention as above set forth may be made without departing from the spirit and scope thereof, and therefore only such limitations should be imposed as are indicated by the appended claims.

I claim:

1. The method of determining the density of an inaccessible fluid within a container which comprises directing a beam of highly penetrating particles from a source of radiation inwardly through the wall of the container and into said fluid wherein the particles are scattered, detecting particles so scattered and returned outwardly through said wall and determining the amount of the returned and detected radiation.

2. The method of determining the density of an inaccessible fluid within a container which comprises directing penetrative radiation from a source inwardly through the wall of the container and into the fluid and then determining the amount of radiation returned to a detector disposed near said source and on the outside of said container, the returned radiation being caused by the diffused reflection or scattering of the radiation in the fluid within the container.

3. The method of determining the density or specific gravity of a fluid flowing through a pipe which comprises placing near the outer surface of the wall of the pipe a source of gamma ray radiation, directing gamma rays from said source through said wall and into the fluid flowing through the pipe whereby some of the rays will be returned outwardly through said pipe wall by the diffused reflection or scattering effect of the fluid on said rays, and measuring the amount of the returned radiation at a point outside said pipe wall.

4. The method of determining the density or specific gravity of a fluid flowing through a pipe which comprises placing against the outer surface of the wall of the pipe a source of neutron radiation, directing neutrons from said source through said wall and into the fluid flowing through the pipe whereby some of the neutrons will be returned outwardly through said pipe wall by the diffused reflection or scattering effect of the fluid on said neutrons and measuring the amount of the returned radiation at a point outside said pipe wall and near said source of radiation.

5. A device for determining the density or specific gravity of a fluid within a vessel, comprising a housing adapted to be placed near the outer surface of the wall of the vessel, a source of penetrative radiation within said housing, means for directing a beam of said radiation from said source through the vessel wall and into said fluid whereby some of the radiation will be returned outwardly of said vessel by the diffused reflection or scattering of the radiation in said fluid, and a device within said housing for detecting radiation so returned.

6. A device for determining the density of a fluid within a container which comprises an instrument having a casing adapted to be placed against the outside surface of the container, a source of penetrative radiation within said container, a device also within said container for determining radiation scattered by said fluid and a collimating system for defining the direction of the beam of radiation when passing into the container and back from the container to the detecting device.

7. A device for determining the density or specific gravity of a fluid within a vessel, comprising a housing adapted to be placed near the outer surface of the wall of the vessel, a source of gamma ray radiation in said housing, means for directing a beam of said gamma rays through the vessel wall and into the fluid in the vessel where the rays will be scattered by said fluid and means in said housing for detecting rays scattered and returned outwardly through the vessel wall.

8. A device for determining the density or specific gravity of a fluid within a vessel, comprising a housing adapted to be placed near the outer surface of the wall of the vessel, a source of gamma ray radiation in said housing, a collimating system for directing a beam of said gamma rays through the vessel wall and into the fluid in the vessel where they will be scattered by said fluid, means in said housing for detecting rays scattered in the fluid and returned outwardly through the vessel wall, a non-penetrable shield disposed between said source and said detecting means for reducing direct radiation from said source to said detecting means and means connected to said detecting means for indicating the amount of returned radiation picked up by said detecting means.

DONALD G. C. HARE.